125,835

UNITED STATES PATENT OFFICE.

CHARLES M. NES, OF BALTIMORE, MARYLAND.

IMPROVEMENT IN REDUCING AND SEPARATING GOLD AND OTHER METALS FROM ORES.

Specification forming part of Letters Patent No. 125,835, dated April 16, 1872.

*To all whom it may concern:*

Be it known that I, CHARLES MOTIER NES, of the city and county of Baltimore and State of Maryland, have invented certain new and useful Improvements in Reducing and Separating Gold, Silver, Copper, and other Ores, of which the following is a specification:

My invention is directed to the separation of the metal from the other substances contained in gold, silver, or copper ores, and in general all ores other than iron ores. The principal feature of my invention consists in the mode of separating the metal from the silica, sulphur, and other impurities of the ore by the employment of magnetic silicide of iron ore, commonly called Codorus ore, and found in York county, Pennsylvania, and in other places, which ore, when taken in certain proportions with the gold, silver, or other ore to be reduced and melted therewith, will, when the mass is in a state of fusion, take up the silica and other impurities, effect a perfect separation, and set the metal free.

To operate in a crucible on the ore to be reduced or separated, I put into the crucible, say, one hundred pounds of the ore, which I will suppose to be silver ore. This ore before being put into the crucible is crushed in the usual manner, and may be either calcined or not, as preferred. To the silver ore I add, say, ten per cent. of magnetic silicide of iron ore, also crushed and broken or ground up. The proportions of the two ores in the charge may vary; but I find that about ten per cent. of the magnetic silicide of iron ore is sufficient. The crucible is then heated in a suitable furnace until the ores are melted, and after thorough fusion of the charge, the cinder or refuse on top of the boiling mass is run off in the usual way, leaving below only the metal, which is in a very fluid condition. This metal consists of the silver and iron previously contained in the two ores.

To separate the iron from the silver, I insert in the fluid metal a steel plate or bar connected with a suitable battery, so as to be magnetized. The iron in the fluid mass will adhere to the magnetized plate, which is removed to allow the iron adhering to it to be knocked off, and is inserted again and again into the bath of metal until every trace of iron is removed therefrom, leaving the silver free from admixture. When this has been done the silver can be poured out into any suitable receptacle or mold.

To treat the finer ores on a large scale, I make use of a reverberatory-furnace, such as described in my Letters Patent No. 123,191, of January 30, 1872. I charge this furnace with the ore I wish to reduce, mixed with ten per cent., more or less, of magnetic silicide of iron ore. After the whole charge is melted and perfectly liquid I tap off the cinder, and the metal is left in the furnace. I then, for the purpose of separating the iron from the other metal contained in this liquid mass, use a magnetized steel plate, as above indicated, until all traces of iron are removed. The metal is then tapped off into suitable receptacles or molds.

In case it is desired to avoid the intermixture of iron with the other metal, the magnetic silicide of iron ore, when crushed and ground up, and before intermixture with the ore which it is desired to reduce, can be sieved or otherwise treated so as to separate the metal octagons or crystals from the remainder of the ore. This remainder or residuum can then be mixed in the proportion above specified with the ore to be reduced. The ore will act in the same way as before, while, at the same time, there will be little or no resultant iron in the liquid metal left after the tapping off of the cinder.

Having now described my invention, and the manner in which the same is or may be carried into effect, what I claim, and desire to secure by Letters Patent, is—

1. The employment in the reduction of gold, silver, copper, and other ores, herein specified, of magnetic silicide of iron ore, substantially as and for the purposes set forth.

2. The process of reducing gold, silver, and other ores, herein specified, by first melting the same with magnetic silicide of iron ore, in the proportions substantially as stated, and then, after the cinder is taken off, removing the iron from the liquid metal by means of a magnetized steel plate, or its equivalent, as set forth.

In testimony whereof I have signed my name to this specification before two subscribing witnesses.

CHAS. MOTIER NES.

Witnesses:
M. BAILEY,
EDM. F. BROWN.